(12) United States Patent
Shishihara et al.

(10) Patent No.: US 10,167,897 B2
(45) Date of Patent: Jan. 1, 2019

(54) TAPERED ROLLER BEARING

(71) Applicant: JTEKT CORPORATION, Osaka-shi, Osaka (JP)

(72) Inventors: Yuki Shishihara, Kashiwara (JP); Shigeo Kamamoto, Kashiwara (JP); Junji Murata, Kashiba (JP); Seiji Nakahama, Osaka (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/635,523

(22) Filed: Jun. 28, 2017

(65) Prior Publication Data
US 2018/0010632 A1 Jan. 11, 2018

(30) Foreign Application Priority Data
Jul. 6, 2016 (JP) .................................. 2016-134432

(51) Int. Cl.
*F16C 19/36* (2006.01)
*F16C 33/46* (2006.01)

(52) U.S. Cl.
CPC ........ *F16C 19/364* (2013.01); *F16C 33/4641* (2013.01)

(58) Field of Classification Search
CPC ............. F16C 33/4605; F16C 33/4676; F16C 19/364; F16C 19/383; F16C 19/385; F16C 19/386; F16C 19/388; F16C 33/4641
See application file for complete search history.

(56) References Cited

U.S. PATENT DOCUMENTS

| 3,199,935 A | * | 8/1965 | Pitner ..................... F16C 19/46 384/573 |
| 3,251,118 A | * | 5/1966 | Pitner ..................... F16C 19/46 29/896.6 |
| 4,425,011 A | | 1/1984 | Cunningham et al. |

(Continued)

FOREIGN PATENT DOCUMENTS

| JP | 2010-174918 A | 8/2010 |
| JP | 2014-202341 A | 10/2014 |

(Continued)

OTHER PUBLICATIONS

Sep. 27, 2017 Office Action issued in U.S. Appl. No. 15/391,992.

(Continued)

*Primary Examiner* — Alan B Waits
(74) *Attorney, Agent, or Firm* — Oliff PLC

(57) ABSTRACT

A tapered roller bearing includes an inner ring, an outer ring, a plurality of tapered rollers, and an annular cage. The cage has a small annular portion, a large annular portion, and a plurality of cage bars that couples the small annular portion and the large annular portion together. The cage is enabled to come into contact with an inner peripheral surface of the outer ring at least on an axially first side so that the contact allows the cage to be positioned in a radial direction. Each of the cage bars has pocket surfaces each of which faces an outer peripheral surface of the corresponding tapered roller, and each pocket surface has a flat surface shape that is straight in a direction from the inner ring toward the outer ring and that is enabled to come into line contact with the corresponding tapered roller.

7 Claims, 4 Drawing Sheets

(56) References Cited

U.S. PATENT DOCUMENTS

| | | | | |
|---|---|---|---|---|
| 5,803,620 | A * | 9/1998 | Yokota | F16C 33/4629 384/580 |
| 6,742,935 | B2 * | 6/2004 | Saji | F16C 19/50 384/127 |
| 2009/0003745 | A1 * | 1/2009 | Tsujimoto | F16C 19/364 384/450 |
| 2009/0016664 | A1 * | 1/2009 | Tsujimoto | F16C 19/364 384/576 |
| 2012/0263405 | A1 * | 10/2012 | Mizuki | F16C 33/4635 384/473 |
| 2013/0148919 | A1 * | 6/2013 | Matsuo | B21K 1/05 384/572 |
| 2014/0221150 | A1 * | 8/2014 | Nakagawa | F16C 33/56 475/348 |
| 2015/0167742 | A1 * | 6/2015 | Murata | F16C 33/366 384/565 |
| 2015/0176649 | A1 * | 6/2015 | Okamoto | F16C 33/6681 384/571 |
| 2015/0252848 | A1 | 9/2015 | Suzuki | |
| 2016/0265587 | A1 | 9/2016 | Kamamoto et al. | |

FOREIGN PATENT DOCUMENTS

| | | |
|---|---|---|
| JP | 2015-102134 A | 6/2015 |
| JP | 2015-169300 A | 9/2015 |
| JP | 2016-089844 A | 5/2016 |
| WO | 81/02918 A1 | 10/1981 |
| WO | 2009/017159 A1 | 2/2009 |

OTHER PUBLICATIONS

U.S. Appl. No. 15/391,992, filed Dec. 28, 2016 in the name of Junji Murata, et al.
Feb. 14, 2018 Notice of Allowance issued in U.S. Appl. No. 15/391,992.

* cited by examiner

AXIALLY FIRST SIDE    AXIALLY SECOND SIDE

TAPERED ROLLER BEARING

INCORPORATION BY REFERENCE

The disclosure of Japanese Patent Application No. 2016-134432 filed on Jul. 6, 2016 including the specification, drawings and abstract, is incorporated herein by reference in its entirety.

BACKGROUND OF THE INVENTION

1. Field of the Invention

The invention relates to a tapered roller bearing.

2. Description of the Related Art

Tapered roller bearings have a larger load capacity and a higher rigidity than ball bearings and are widely used for various machines. By way of example, tapered roller bearings are used for differential apparatuses, transmissions, and the like in automobiles. For automobiles, a reduction in rotational resistance of components contributes to reducing fuel consumption. For example, there has been a demand to reduce torque of tapered roller bearings used for travel driving systems such as differential apparatuses.

Resistance resulting from rotation of the tapered roller bearing includes stirring resistance of lubricant. Thus, to reduce the torque, a cage may be used to limit flow of lubricant into a bearing interior so as to inhibit an excessive amount of lubricant from being fed into the bearing interior (see, for example, Japanese Patent Application Publication No. 2014-202341 (JP 2014-202341 A)).

Resistance resulting from rotation of the tapered roller bearing includes, besides the stirring resistance of the lubricant, viscous resistance (shearing resistance) of the lubricant. The viscous resistance of the lubricant results from, for example, the lubricant present between the cage and tapered rollers. The resistance increases consistently with the volume of the lubricant between the cage and the tapered rollers which is subjected to shearing, hindering a reduction in the torque of the tapered roller bearing.

SUMMARY OF THE INVENTION

An object of the invention is to provide a tapered roller bearing that serves to reduce not only stirring resistance of lubricant but also viscous resistance (shearing resistance) of the lubricant to enable a reduction in torque.

A tapered roller bearing in an aspect of the invention includes an inner ring having, on an outer peripheral side, a conical inner raceway surface with a diameter increasing from an axially first side toward an axially second side, an outer ring having, on an inner peripheral side, a conical outer raceway surface with a diameter increasing from the axially first side toward the axially second side, a plurality of tapered rollers provided in an annular space formed between the inner ring and the outer ring and rolling on the inner raceway surface and the outer raceway surface, and an annular cage that holds the tapered rollers. The cage has a small annular portion positioned on the axially first side with respect to the tapered rollers, a large annular portion positioned on the axially second side with respect to the tapered rollers, and a plurality of cage bars that couples the small annular portion and the large annular portion together. The cage is enabled to come into contact with an inner peripheral surface of the outer ring at least on the axially first side so that the contact allows the cage to be positioned in a radial direction. Each of the cage bars has pocket surfaces each of which faces an outer peripheral surface of the corresponding tapered roller. Each pocket surface has a flat surface shape that is straight in a direction from the inner ring toward the outer ring and that is enabled to come into line contact with the corresponding tapered roller.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
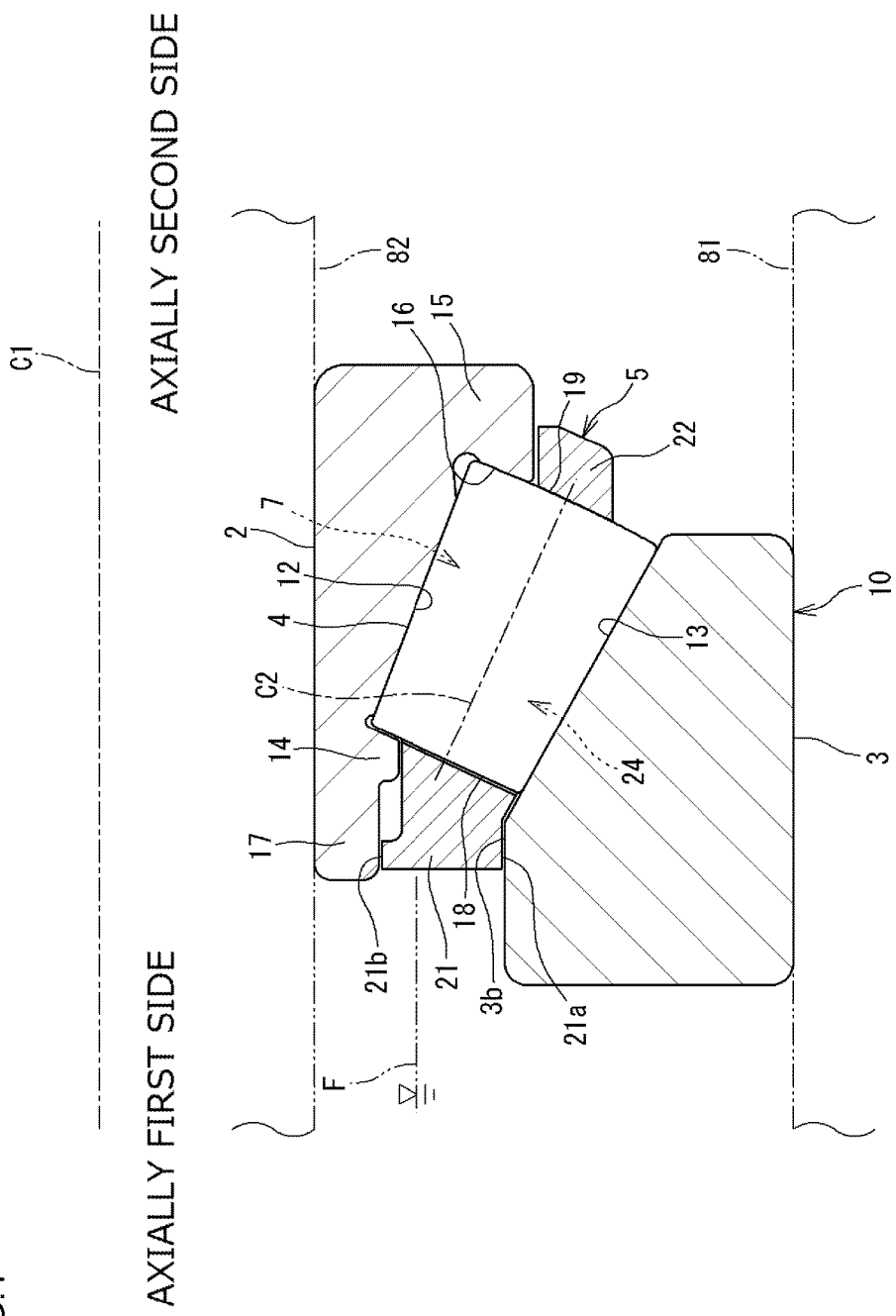
FIG. 1 is a sectional view depicting an embodiment of a tapered roller bearing.

An embodiment of the invention will be described below based on the drawings. FIG. 1 is a sectional view depicting an embodiment of a tapered roller bearing. A tapered roller bearing 10 is used for a differential apparatus in an ordinary-sized automobile. The tapered roller bearing 10 supports, in a housing 81, a shaft 82 that rotates along with a pinion, so as to make the shaft 82 rotatable. Lubricant (oil) is stored in the housing 81. The lubricant is used to lubricate the tapered roller bearing 10. The tapered roller bearing 10 described below may also be used for other applications.

The tapered roller bearing 10 includes an inner ring 2, an outer ring 3, a plurality of tapered rollers 4, and a cage 5. The inner ring 2, the outer ring 3, and the cage 5 are annular members all centered around a common axis. The common axis is a center line of the tapered roller bearing 10, and the center line is hereinafter referred to as a bearing center line C1. A center line of each of the tapered rollers 4 is hereinafter referred to as a roller center line C2.

The inner ring 2 is formed using bearing steel, steel for machine structural use, or the like and has an inner raceway surface 12 formed on an outer peripheral side of the inner ring 2 and on which the tapered rollers 4 roll. The inner raceway surface 12 has a conical shape (tapered shape) having a diameter increasing from an axially first side (in FIG. 1, a left side) toward an axially second side (in FIG. 1, a right side). The inner ring 2 has a cone front face rib (hereinafter referred to as a small rib) 14, a cone back face rib (hereinafter referred to as a large rib) 15, and a cylindrical portion 17. The small rib 14 is provided on the axially first side with respect to the inner raceway surface 12 and protrudes outward in a radial direction. The large rib 15 is provided on the axially second side with respect to the inner raceway surface 12 and protrudes outward in the radial direction. The cylindrical portion 17 extends from the small rib 14 toward the axially first side.

The outer ring 3 is formed using bearing steel, steel for machine structural use, or the like, and has, on an inner peripheral side, an outer raceway surface 13 that faces the inner raceway surface 12 and on which the tapered rollers 4 roll. The outer raceway surface 13 has a conical shape (tapered shape) having a diameter increasing from the axially first side toward the axially second side.

The tapered rollers 4 are members formed using bearing steel or the like. The tapered rollers 4 are provided in an annular space 7 formed between the inner ring 2 and the outer ring 3, and can roll on the inner raceway surface 12 and the outer raceway surface 13. Each of the tapered rollers 4 has a small end face 18 located on the axially first side and having a small diameter and a large end face 19 located on the axially second side and having a large diameter. The large end face 19 is in contact with a rib surface (side surface) 16 of the large rib 15 of the inner ring 2. Rotation of the tapered roller bearing 10 (in the present embodiment, the inner ring 2) brings the large end face 19 and the rib surface 16 into sliding contact with each other.

Figure 2:
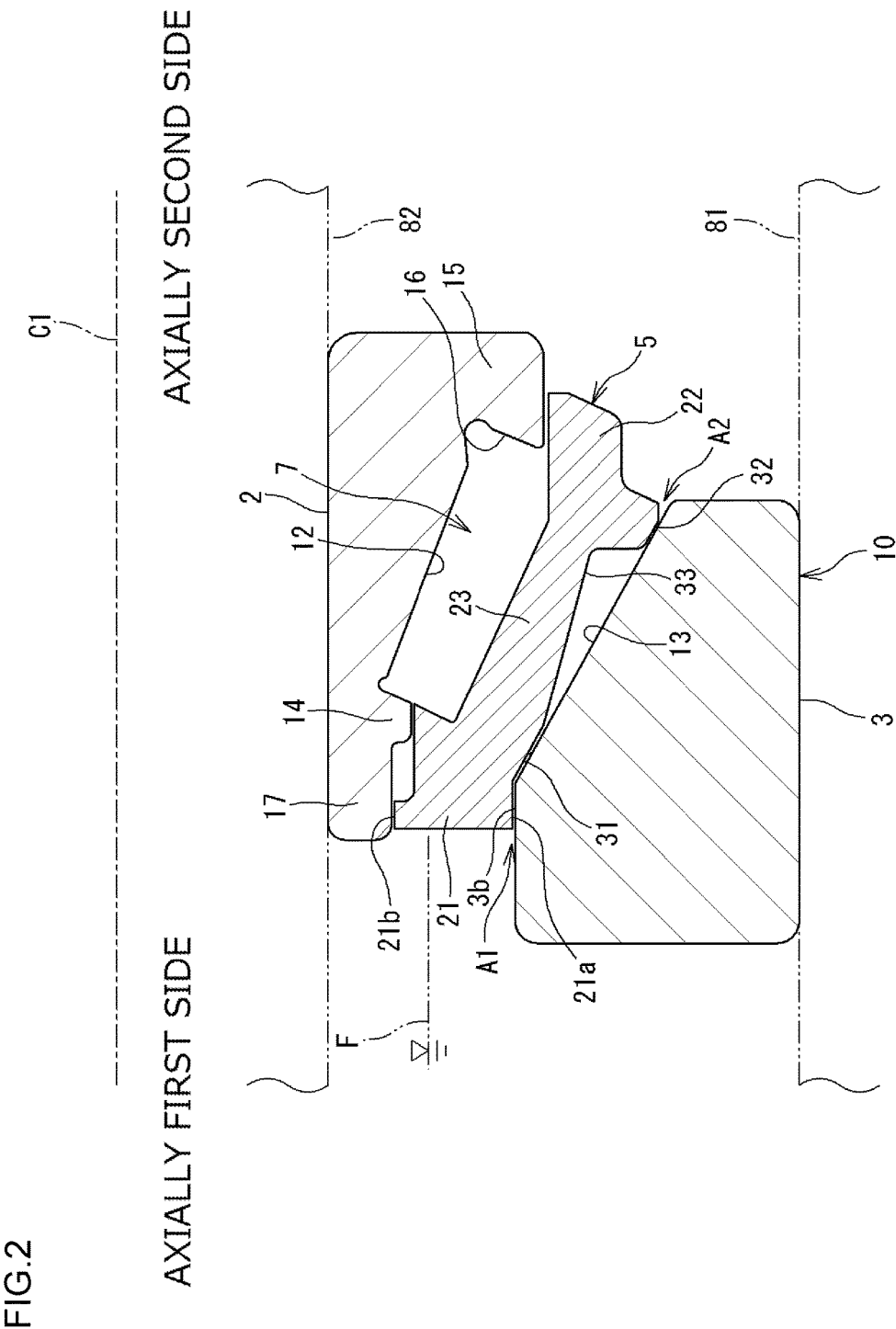
FIG. 2 is a sectional view of the tapered roller bearing in a position different from a position in a section depicted in FIG. 1.

The cage 5 is provided in the annular space 7 along with the tapered rollers 4 to hold the tapered rollers 4. FIG. 2 is a sectional view of the tapered roller bearing 10 in a position different from a position depicted in FIG. 1. In FIG. 1 and FIG. 2, the cage 5 has a small annular portion 21 shaped like a ring, a large annular portion 22 shaped like a ring, and a plurality of cage bars 23. The small annular portion 21 is positioned on the axially first side with respect to the tapered rollers 4. The large annular portion 22 is positioned on the axially second side with respect to the tapered rollers 4. The cage bars 23 couple the small annular portion 21 and the large annular portion 22 together. The large annular portion 22 has a larger outside diameter than the small annular portion 21, and in the present embodiment, also has a larger bore diameter than the small annular portion 21.

Figure 3:
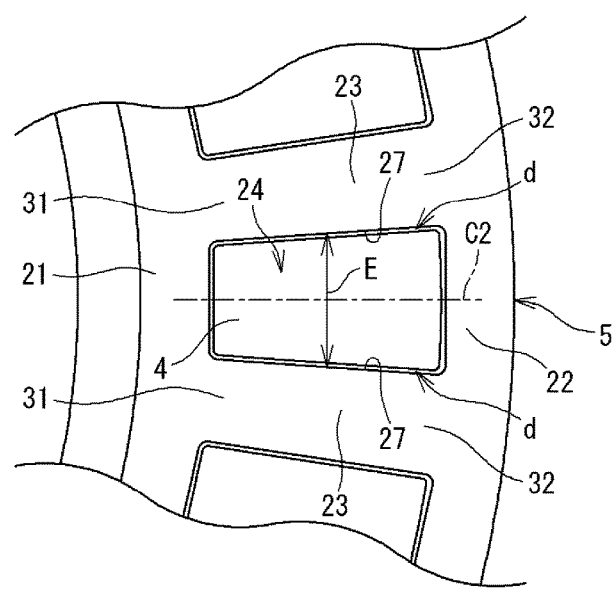
FIG. 3 is a diagram illustrating a part of a cage as viewed outward in a radial direction.

FIG. 3 is a diagram illustrating a part of the cage 5 as viewed outward in the radial direction. The cage bars 23 are provided at intervals in a circumferential direction. Pockets 24 in which the respective tapered rollers 4 are housed (held) are spaces each formed between the small annular portion 21 and the large annular portion 22 and between two cage bars 23, 23 adjacent to each other in the circumferential direction. A minute clearance is formed between each of the pockets 24 and the corresponding tapered roller 4. The cage 5 in the present embodiment is formed of resin (formed of a synthetic resin) by injection molding.

In the tapered roller bearing 10 depicted in FIG. 1 and FIG. 2, rotation of the bearing (inner ring 2) results in a pump action that allows lubricant to flow from the axially first side toward the axially second side. The mechanism of generation of the pump action is as described below. The lubricant and air present in the annular space 7 have force components that act outward in the radial direction based on a centrifugal force resulting from rotation of the bearing. The outer raceway surface 13 of the outer ring 3 has a conical shape as described above. Thus, the lubricant and air in the annular space 7 flow toward the axially second side along the outer raceway surface 13. Generation of this flow leads to an action that draws the lubricant and air present in a bearing exterior on the axially first side, into the annular space 7. Consequently, the tapered roller bearing 10 is subjected to the pump action that allows the lubricant to flow from the axially first side to the axially second side.

In FIG. 2, on the axially first side of the cage bars 23 and on a radially outer side of the cage bars 23 (closer to the outer ring 3 than to the inner ring 2), the cage 5 has a first guide surface 31 that can come into contact with a part of an inner peripheral surface (outer raceway surface 13) of the outer ring 3. On the axially second side of the cage bars 23 and on the radially outer side of the cage bars 23 (closer to the outer ring 3 than to the inner ring 2), the cage 5 has a second guide surface 32 that can come into contact with another part of the inner peripheral surface (outer raceway surface 13) of the outer ring 3. A recessed surface 33 is formed between the first guide surface 31 and the second guide surface 32 and away from the inner peripheral surface of the outer ring 3.

When the cage 5 and the outer ring 3 are concentrically placed (as illustrated in FIG. 2), a minute clearance (A1) is formed between the first guide surface 31 and the inner peripheral surface of the outer ring 3. A minute clearance (A2) is formed between the second guide surface 32 and the inner peripheral surface of the outer ring 3. In contrast, radial displacement of the cage 5 with respect to the outer ring 3 allows the first guide surface 31 to come into contact with the inner peripheral surface of the outer ring 3, while allowing the second guide surface 32 to come into contact with the inner peripheral surface of the outer ring 3. Thus, the cage 5 can come into contact with the inner peripheral surface of the outer ring 3 on the axially first side and on the axially second side so that the contact allows the cage to be positioned in the radial direction. In other words, the tapered roller bearing 10 is an outer-ring guiding bearing in which the cage 5 is guided by the outer ring.

Figure 4:
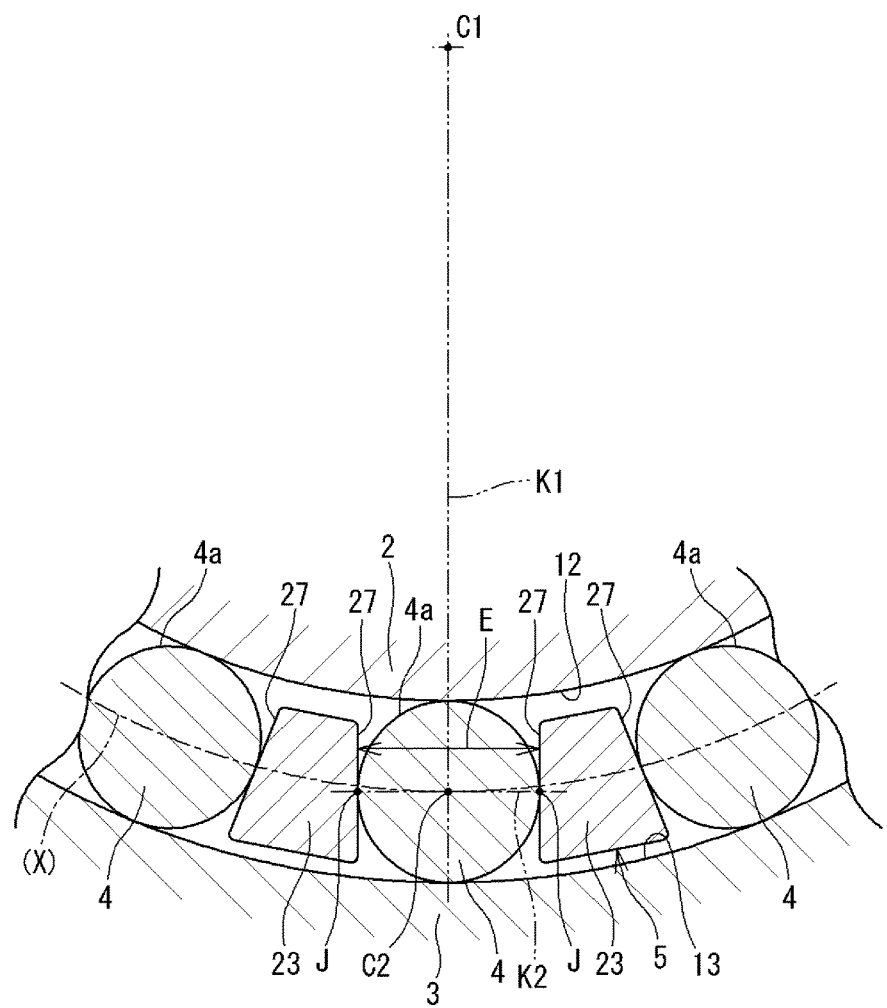
FIG. 4 is a sectional view of tapered rollers and the cage.

The pockets 24 in the cage 5 will further be described (see FIG. 3). A plurality of the pockets 24 is formed along the circumferential direction such that a single tapered roller 4 is housed in each of the pockets 24. FIG. 4 is a sectional view of the tapered rollers 4 and the cage 5. As depicted in FIG. 4, each of the cage bars 23 has pocket surfaces 27 located on opposite sides of the cage bar 23 in the circumferential direction so as to face outer peripheral surfaces 4a of the corresponding tapered rollers 4. Each of the pocket surfaces 27 is a flat surface, and each of the tapered rollers 4 comes into line contact with the corresponding pocket surface 27. In FIG. 4, a contact position where the tapered roller 4 and the pocket surface 27 contact each other is denoted by reference character J. The pocket surface 27 will be specifically described. The pocket surface 27 is a circumferential side surface of the cage bar 23, and has a flat surface shape that is straight in a direction from the inner ring 2 toward the outer ring 3 as depicted in FIG. 4 and that is straight in a direction from the small annular portion 21 toward the large annular portion 22 as depicted in FIG. 3.

With reference to FIG. 4, a manner of contact between each tapered roller 4 and the corresponding pocket surface 27 will be described. With the cage 5 and the tapered rollers 4 concentrically arranged with reference to the bearing center line C1, the pocket surface 27 can come into line contact with the tapered roller 4 at a position on a second virtual plane K2 that is orthogonal to a first virtual surface K1 including the bearing center line C1 and the roller center line C2 and that passes through the roller center line C2. Since FIG. 4 is a sectional view, when the description is limited to the section depicted in FIG. 4, the following may hold true. The pocket surface 27 can come into point contact with the tapered roller 4 at a position on the second virtual plane (K2) that is orthogonal to the first virtual surface (K1) including the bearing center line C1 and the roller center line C2 and that passes through the roller center line C2.

In the cage 5 having the pocket surfaces 27 configured as described above, in a section that is orthogonal to the roller center line C2, the distance E between the adjacent pocket surfaces 27 located on the opposite sides of the tapered roller 4 is constant in a direction from the inner ring 2 toward the outer ring 3. Obviously, the outer peripheral surface 4a of the tapered roller 4 has a truncated conical shape (see FIG. 3). A constant minute clearance d is formed between the outer peripheral surface 4a (with which the pocket surface 27 can come into line contact) and the pocket surface 27. Thus, the distance E has a different value in a different section (that is different from the section in FIG. 4). In other words, the distance E has a value that gradually varies in a direction along the roller center line C2.

In the tapered roller bearing 10 configured as described above, the cage 5 (see FIG. 2) can come into contact with the inner peripheral surface (outer raceway surface 13) of the outer ring 3 on the axially first side and on the axially second side so that the contact allows the cage 5 to be positioned in the radial direction. Thus, on the axially first side, the clearance A1 formed between the first guide surface 31 of the cage 5 and the outer raceway surface 13 of the outer ring 3 is small. Consequently, the lubricant present in the bearing exterior on the axially first side is less likely to enter the annular space 7 through an area between the cage 5 and the outer ring 3. In other words, the entry of the lubricant into the annular space 7 is limited. For example, rotation of the tapered roller bearing 10 results in the above-described pump action to cause the lubricant in the bearing exterior on the axially first side to start flowing into the annular space 7. However, this inflow is limited by the cage 5. Even when the rotation of the tapered roller bearing 10 is stopped and an oil level F of the lubricant stored in the housing 81 is located at such a position as depicted in FIG. 1 and FIG. 2, the lubricant is less likely to enter the annular space 7.

In the present embodiment, the minute clearance is also formed between the outer peripheral surface 21a of the small annular portion 21 and the axially-first-side cylindrical surface 3b of the outer ring 3 to limit the inflow of the lubricant. The minute clearance is also formed between the inner peripheral surface 21b of the small annular portion 21 and the outer peripheral surface of the cylindrical portion 17 of the inner ring 2 to limit the inflow of the lubricant.

Since the entry of the lubricant into the annular space 7 is limited as described above, the amount of the lubricant in the annular space 7 can be reduced. This enables a reduction in stirring resistance that may be offered by the lubricant during rotation of the bearing.

In the cage 5 (see FIG. 4), each pocket surface 27 has a flat surface shape that is straight in the direction from the inner ring 2 toward the outer ring 3 and that can come into line contact with the corresponding tapered roller 4. Consequently, the pocket surface 27 is a flat surface and is configured to come into line contact with the tapered roller 4. This reduces the range of the contact between the pocket surface 27 and the tapered roller 4 to enable a reduction in viscous resistance (shearing resistance) of the lubricant.

As described above, in a section that is orthogonal to the roller center line C2, the distance E between the adjacent pocket surfaces 27 located on the opposite sides of the tapered roller 4 is constant along the direction from the inner ring 2 toward the outer ring 3. Thus, in the entire area of the pocket surface 27 except for the portion thereof that contacts the tapered roller 4, in other words, on the outer ring 3 side and the inner ring 2 side of the pocket surface 27, the pocket surface 27 is located away from the outer peripheral surface 4a of the tapered roller 4. Thus, the lubricant is less likely to be present between the pocket surface 27 and the tapered roller 4, enabling an effective reduction in viscous resistance of the lubricant.

The shape of the pocket surface 27 as described above enables the cage 5 to be displaced in the radial direction without being restrained by the tapered rollers 4. However, the cage 5 is positioned in the radial direction by coming into contact with the inner peripheral surface (outer raceway surface 13) of the outer ring 3. In other words, the tapered roller bearing 10 in the present embodiment is an "outer-ring guiding" bearing in which the cage 5 is positioned in the radial direction by the outer ring 3. Thus, the cage 5 is stabilized to allow stabilization of behavior of the tapered rollers 4 held by the cage 5. In contrast, although not depicted in the drawings, in a "rolling-element guiding" tapered roller bearing in which the cage is positioned by the tapered rollers, the distance between each tapered roller and the corresponding pocket surface is reduced over a wide range, thus increasing the viscous resistance of the lubricant. In the present embodiment, the distance between the tapered roller 4 and the corresponding pocket surface 27 is reduced only in the area where the tapered roller 4 and the pocket surface 27 can come into line contact with each other (contact position J). However, the distance is larger in the other areas, enabling a reduction in the viscous resistance of the lubricant.

The pocket surface 27 comes into contact (line contact) with the corresponding tapered roller 4 at a position closer to the outer ring 3 than a pitch circle X of the tapered rollers 4 in a section that is orthogonal to the bearing center line C1. The pitch circle X is a circle that passes through the centers (C2) of the plurality of tapered rollers 4 in the section. Consequently, the cage 5 (cage bars 23) is configured to be inversely tapered (to have a diameter increasing) toward the outer ring 3, and this configuration is suitable for allowing the cage 5 to be guided by the outer ring.

As depicted in FIG. 4, since the pocket surfaces 27 are flat surfaces, each cage bar 23 has a trapezoidal sectional shape. Thus, in an area between the pocket surface 27 and the corresponding tapered roller 4 and closer to the outer ring 3, a part of the cage bar 23 is present, allowing the lubricant to be eliminated. As a result, the amount of the lubricant in the annular space 7 is reduced as much as possible to reduce the stirring resistance of the lubricant.

As described above, the tapered roller bearing 10 in the present embodiment enables a reduction in the stirring resistance of the lubricant that may be generated during rotation of the bearing. This also enables a reduction in the viscous resistance (shearing resistance) of the lubricant and thus in torque of the tapered roller bearing 10.

The embodiment as disclosed above is illustrative in every way and is not restrictive. In other words, the tapered roller bearing in the present invention is not limited to the illustrated form but may be in any other form within the scope of the invention. In the above-described embodiment, the cage 5 has the first guide surface 31 and the second guide surface 32, which allow the cage 5 to contact the outer ring 3 on the axially first side and on the axially second side, respectively. The cage 5 is more stable when thus contacting the outer ring 3 both on the axially first side and on the axially second side, but the guide surface 32 on the axially second side may be omitted. In other words, the cage 5 may be able to contact the inner peripheral surface of the outer ring 3 at least on the axially first side so that the contact allows the cage 5 to be positioned in the radial direction. In the above-described embodiment, the tapered roller bearing 10 is used for a differential apparatus (differential pinion) in an ordinary-sized automobile. However, the tapered roller bearing 10 may be used for any other rotating machine.

The tapered roller bearing in the invention serves to reduce not only the stirring resistance of the lubricant but also the viscous resistance of the lubricant to enable a reduction in torque.

What is claimed is:

1. A tapered roller bearing comprising:

an inner ring having, on an outer peripheral side, a conical inner raceway surface with a diameter increasing from an axially first side toward an axially second side;

an outer ring having, on an inner peripheral side, a conical outer raceway surface with a diameter increasing from the axially first side toward the axially second side;

a plurality of tapered rollers provided in an annular space formed between the inner ring and the outer ring and rolling on the inner raceway surface and the outer raceway surface; and an annular cage that holds the tapered rollers, wherein the cage has a small annular portion positioned on the axially first side with respect to the tapered rollers, a large annular portion positioned on the axially second side with respect to the tapered rollers, and a plurality of cage bars that couples the small annular portion and the large annular portion together, and the cage is enabled to come into contact with an inner peripheral surface of the outer ring at least on the axially first side so that the contact allows the cage to be positioned in a radial direction, each of the cage bars has pocket surfaces each of which faces an outer peripheral surface of the corresponding tapered roller, and each pocket surface has a flat surface shape that is straight in a direction from the inner ring toward the outer ring, that is enabled to come into line contact with the corresponding tapered roller, wherein the pocket surface, in a section that is orthogonal to a tapered roller center line, is parallel to a first virtual plane including the bearing center line and the tapered roller center line and that passes through the tapered roller center line, and the pocket surface is enabled to come into line contact with the corresponding tapered roller at a position on a second virtual plane that is orthogonal to the first virtual plane radially outward of a pitch circle of the tapered rollers, the second virtual plane including the roller center line.

2. The tapered roller bearing according to claim 1, wherein each pocket surface comes into contact with the corresponding tapered roller at a position located closer to the outer ring than a pitch circle of the tapered rollers is to the outer ring in a section that is orthogonal to a bearing center line.

3. The tapered roller bearing according to claim 1, wherein, in a section that is orthogonal to a roller center line, a distance between the adjacent pocket surfaces located on opposite sides of the corresponding tapered roller is constant in the direction from the inner ring toward the outer ring.

4. The tapered roller bearing according to claim 2, wherein, in a section that is orthogonal to a roller center line, a distance between the adjacent pocket surfaces located on opposite sides of the corresponding tapered roller is constant in the direction from the inner ring toward the outer ring.

5. The tapered roller bearing according to claim 1, wherein the small annular portion includes a rib positioned adjacent the axially first side of the inner ring and extending toward the inner ring, the rib including an inner peripheral surface that is configured to form a clearance with the inner ring and that allows contact between the inner peripheral surface and the inner ring.

6. The tapered roller bearing according to claim 1, wherein the large annular portion includes a first portion extending axially from the cage bars and overlaps with a large rib portion of the inner ring, the large rib portion extending radially outward toward the first portion.

7. The tapered roller bearing according to claim 1, wherein the large annular portion includes a portion extending toward the outer ring, the portion including an inner peripheral surface that is configured to form a clearance with the outer ring and that allows contact between the inner peripheral surface and the outer ring.

* * * * *